United States Patent [19]
Jacquet et al.

[11] Patent Number: 6,023,457
[45] Date of Patent: Feb. 8, 2000

[54] DATA TRANSMISSION INSTALLATION OF THE RADIO NETWORK TYPE, AND CORRESPONDING METHOD

[75] Inventors: Philippe Jacquet, Buc; Paul Muhlethaler, Maisons Laffite, both of France

[73] Assignee: Inria Institut National de Recherche En Informatique Et En Automatique, Le Chesnay Cedex, France

[21] Appl. No.: 08/966,016

[22] Filed: Nov. 7, 1997

Related U.S. Application Data

[63] Continuation of application No. 08/307,579, filed as application No. PCT/FR93/00317, Mar. 30, 1993, Pat. No. 5,689,510.

[30] Foreign Application Priority Data

Apr. 2, 1992 [FR] France .................................. 92 04032

[51] Int. Cl.$^7$ ....................................................... H04J 3/02
[52] U.S. Cl. ............................................. 370/276; 370/351
[58] Field of Search ..................................... 370/310, 312, 370/252, 257, 346, 347, 320, 335, 342, 437, 445, 449, 451, 450, 460, 461, 463, 465, 466, 467, 503, 241, 903, 351, 352, 389, 276; 375/205, 354, 356, 363, 364–366, 200; 455/13.2, 235.1, 3.2

[56] References Cited

U.S. PATENT DOCUMENTS 4,665,519  5/1987  Kirchner et al. ........................ 370/94
5,040,175  8/1991  Tuch et al. ............................. 370/85.2
5,418,784  5/1995  Rakerishman et al. ................ 370/85.3
5,689,510  11/1997 Jacquet et al. .......................... 370/445

FOREIGN PATENT DOCUMENTS

86/04755  8/1986  WIPO .
88/044967 6/1988  WIPO .
91/05416  4/1991  WIPO .

Primary Examiner—Dang Ton
Attorney, Agent, or Firm—Foley & Lardner

[57] ABSTRACT

A data transmission installation includes at least two data processing terminals(Pa,Pb), each equipped with a network interface(Ia,Ib) fro transmitting messages on request, and collecting received messages, a transmission/reception management device(ARC) giving instructions confirming transmission or reception, a test unit for defining a recognized collision, and a unit for resolving collisions, following a recognized collision condition. Each of the data processing terminals includes a multi-directional radio transmission/reception device controlled in accordance with the confirming instructions fro the transmission of messages to be exchanged. In response at least to the start of an instruction confirming transmission, the radio transmission/reception device operates in rapidly alternating transmission/reception, according to a pattern chosen in order to be peculiar to the data processing terminal. The test unit is configured to recognize a collision if a signal of a level greater than a first level threshold is received during a substantial part of at least one silence in the rapidly alternating transmission/reception.

18 Claims, 10 Drawing Sheets

| Destination address | Source address | Code | Data |
|---|---|---|---|

FIG. 4A

| Relay destination | Relay source | LARA code | Buffer | Destination address | Source address | Code | Data |
|---|---|---|---|---|---|---|---|

FIG. 4B

| Point to point code | Number of skips |
|---|---|

FIG. 4C

| Broadcast code | Number of relays | Relay 1 destination | ... | Relay n destination | Broadcast number | Number of skips |
|---|---|---|---|---|---|---|

FIG. 4D

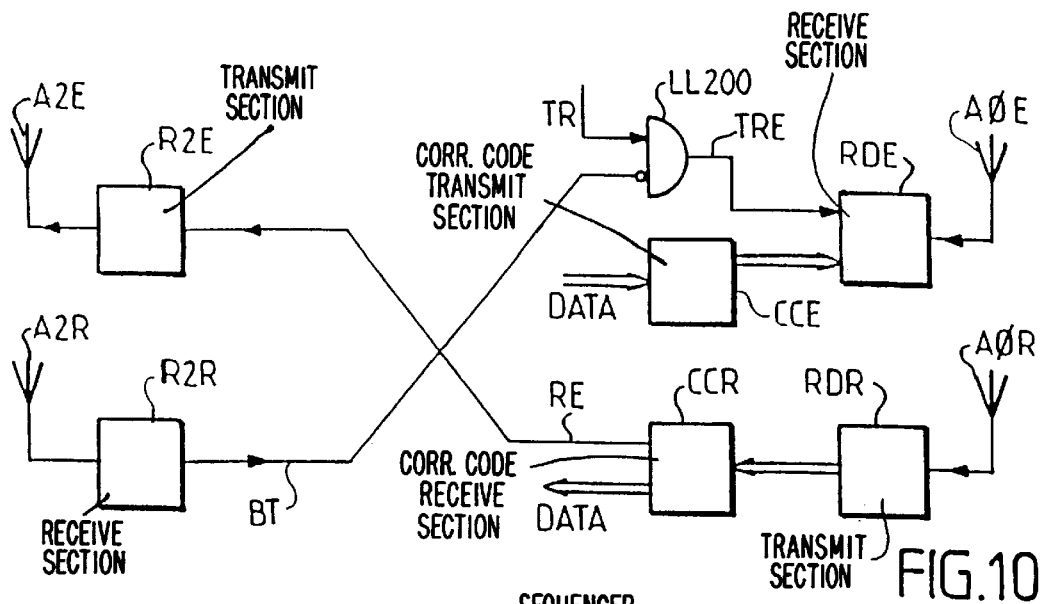
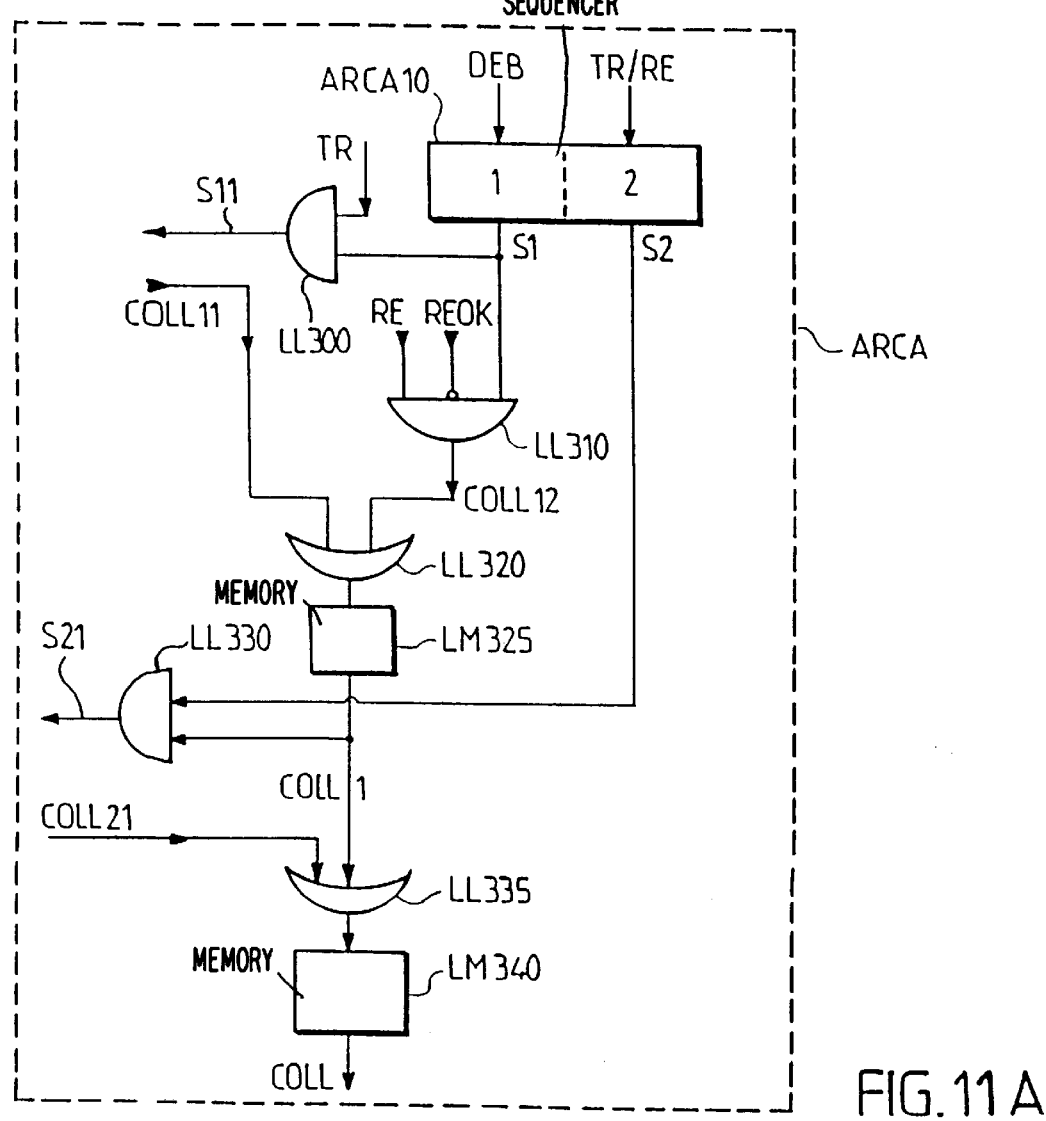

DATA TRANSMISSION INSTALLATION OF THE RADIO NETWORK TYPE, AND CORRESPONDING METHOD

This application is a continuation of application Ser. No. 08/307,579, filed Sep. 26, 1994, which is a 371 of PCT/FR93/00317, filed Mar. 30, 1993 now U.S. Pat. No. 5,689,510.

BACKGROUND OF THE INVENTION

1. Field of the Invention

The invention concerns computer networks which allow the exchange of information or "data" between different terminals.

2. Related Art

Such a network conventionally comprises a transmission medium, generally an electrical or fibre optic cable. Stations or terminals are connected at various places on this cable, this connection being made through a "network interface".

It is essential for the terminals to understand each other, despite their multiplicity. In some computer networks, a rule (multiplexing, token) is determined for this purpose, in accordance with which no more than one of the terminals may transmit over the communication medium at a given moment. Another technique permits "random access" to the network, that is to say several terminals may transmit at the same time. One consequence of this multiple access is that "collisions" may occur, and it will then be necessary to resolve them.

The ETHERNET (registered trade mark) network, governed by the standard known as IEEE 802.3, is of the random access type. The network management protocol is of the multiple access carrier sensing type with collision detection, or CSMA/CD (Carrier Sense Multiple Access with Collision Detection).

The implementation of such a network, but with the ether as the communication medium, that is to say with transmission by radio waves, poses various problems which the present invention will help to resolve.

SUMMARY OF THE INVENTION

A first aim of the invention is to improve the detection or recognition of collision, when a radio network is involved.

The invention also aims to ensure that all the stations or terminals concerned will have common access to collision information, which is necessary for the consistency of subsequent collision resolution operations.

The invention also aims to ensure correct maintenance of frequency synchronisation between the various terminals connected by radio.

In addition, the invention aims to take account of the special characteristics of radio transmissions, which result in the existence of several pathways over a set of three non-aligned terminals, but the possible preclusion of some of these pathways by obstacles.

In addition, the invention aims to allow indirect transmission of information between two terminals, via one or more intermediate terminals.

The data transmission installation proposed here is of the type comprising at least two data processing terminals (the word "processing" being taken in its most elementary sense). Each terminal is equipped with a network interface, capable of transmitting messages on request, and collecting received messages. This comprises a transmission/reception management device having a collision detector and a means for collision resolution, following recognition of a collision condition. One of the essential functions of this management device is the issuing of instructions confirming transmission or reception to the network interface.

According to a first aspect of the invention, each terminal has a multi-directional radio transmission/reception device (effective in several directions, but not necessarily omni-directional), with:

a transceiver operating on a so-called central channel, for the transmission of messages to be exchanged, and controlled in accordance with the said confirming instructions, and an auxiliary transceiver operating on at least one side channel.

In response at least to the start of an instruction confirming transmission, the auxiliary transceiver, capable of rapid transmission/reception switching, operates in rapidly alternating transmission/reception, according to a chosen pattern which is peculiar to it (preferably substantially random) in order to be peculiar to this transmission/reception device.

During transmission, a collision is then recognised by the collision detector if a level of signal greater than a first level threshold is received during a substantial part of at least one silence on this side channel, indicating the concomitant transmission of another terminal on this side channel.

Besides this, the network interface is designed to recognise a collision during reception by violation of a predefined criterion, associated with codes for error detection and/or correction.

In this way, preliminary information on collision, during transmission and/or reception, is defined in each terminal or station. It is also necessary to ensure that the various terminals will have the same information on collision available.

To that end, according to an important aspect of the invention, when a terminal has recognised a collision, it initiates a "transmission on collision" or "collision indication transmission", which consists in transmitting a signal with specific time and frequency characteristics, for example a pure frequency of minimum duration, on a side channel. In other cases, the side channel is monitored to determine whether another terminal is indicating a collision.

If, at the start, the terminal were itself "active" (that is to say starting or "attempting" transmission), it may initiate "active monitoring" consisting of repeating any signal representing collision which it might receive during the predetermined period. In this way, any "active" transmitter propagates "collision" information to all stations within receiving range.

According to another aspect of the invention, provision is made for a second side channel on which any terminal which receives a signal of sufficient gain to be processed (a "demodulatable" signal) will transmit an engaged signal, which will be interpreted by all other terminals (within radio range) as a ban on transmission.

According to another aspect of the invention, in the absence of sufficient natural traffic, the management device is designed to force the transmission of artificial messages, in order to allow the maintenance of a mutual pilot frequency setting in the various terminals, as will be described later. Advantageously, this decision to transmit artificial messages obeys substantially random criteria.

The artificial messages may be used for service purposes (that is to say usefully, but not for the actual data to be transmitted).

On the one hand they may be used for the exchange of information used for understanding the messages, where these are transcoded. On the other hand they may be used to transmit information or tables defining relay methods between various terminals, where transmission between remote terminals requiring intermediate relays is concerned.

BRIEF DESCRIPTION OF THE DRAWINGS

Other characteristics and advantages of the invention will emerge from examination of the following detailed description, and the accompanying drawings, in which:

FIGS. 4A to 4D illustrate the frame formats;

FIG. 6 is a more detailed functional diagram of one part of FIG. 5, while

FIG. 10 is an electrical diagram of the operations carried out on the second side channel;

FIG. 11A is an equivalent electrical diagram of the operations of the automatic collision detector, while

The accompanying drawings are, essentially, of a definite nature. They consequently form an integral part of the description and can serve not only to supplement it but also contribute to the definition of the invention where appropriate.

DETAILED DESCRIPTION

Figure 1:
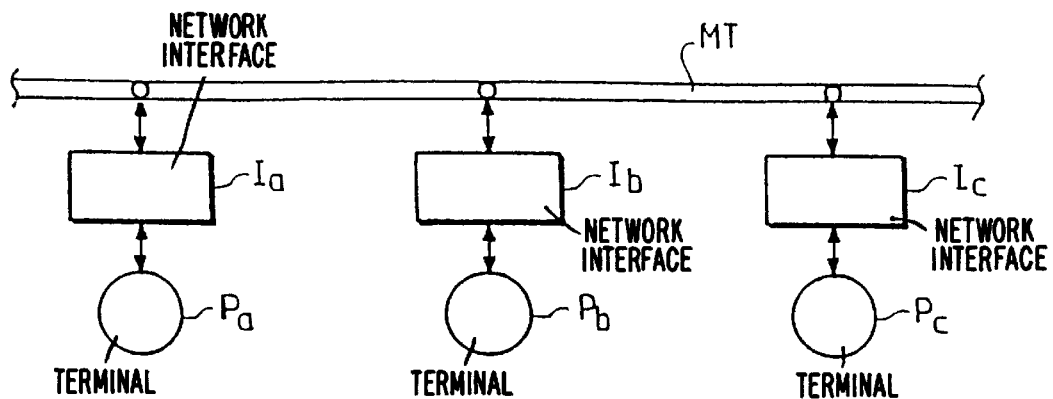
FIG. 1 is a highly simplified diagram of a conventional computer network where the transmission medium is a cable.

In FIG. 1, a transmission medium MT is connected to network interfaces Ia to Ic, respectively connected to terminals Pa to Pc. This is the conventional structure of a data transmission computer network, to which the CSMA/CD protocol already mentioned can be applied, in accordance with IEEE 802.3.

Experts are aware that the models defining such interfaces are specified "in layers" (ISO standard), to each of which a precise function is assigned. This partitioning into functional layers makes it possible to ensure the compatibility of components of the network from different sources, when they are interconnected. Reference will be made below to this concept of layer. Moreover, distinction will be made between the protocol layers proper and the upper layers of the protocol.

Terminals such as Pa are data processing terminals (the word processing is used here in the most elementary sense, since this processing may be very simple). All processing carried out in the terminal is outside the data transmission proper. However, in the terminal there may be specific operations taking specific account of the nature of and certain conditions applicable to data transmission. These are the upper layers of the protocol.

The layers of the protocol itself will on the other hand govern the transmission of data in its basic state, in a way which makes it possible to ensure its security.

Figure 2:
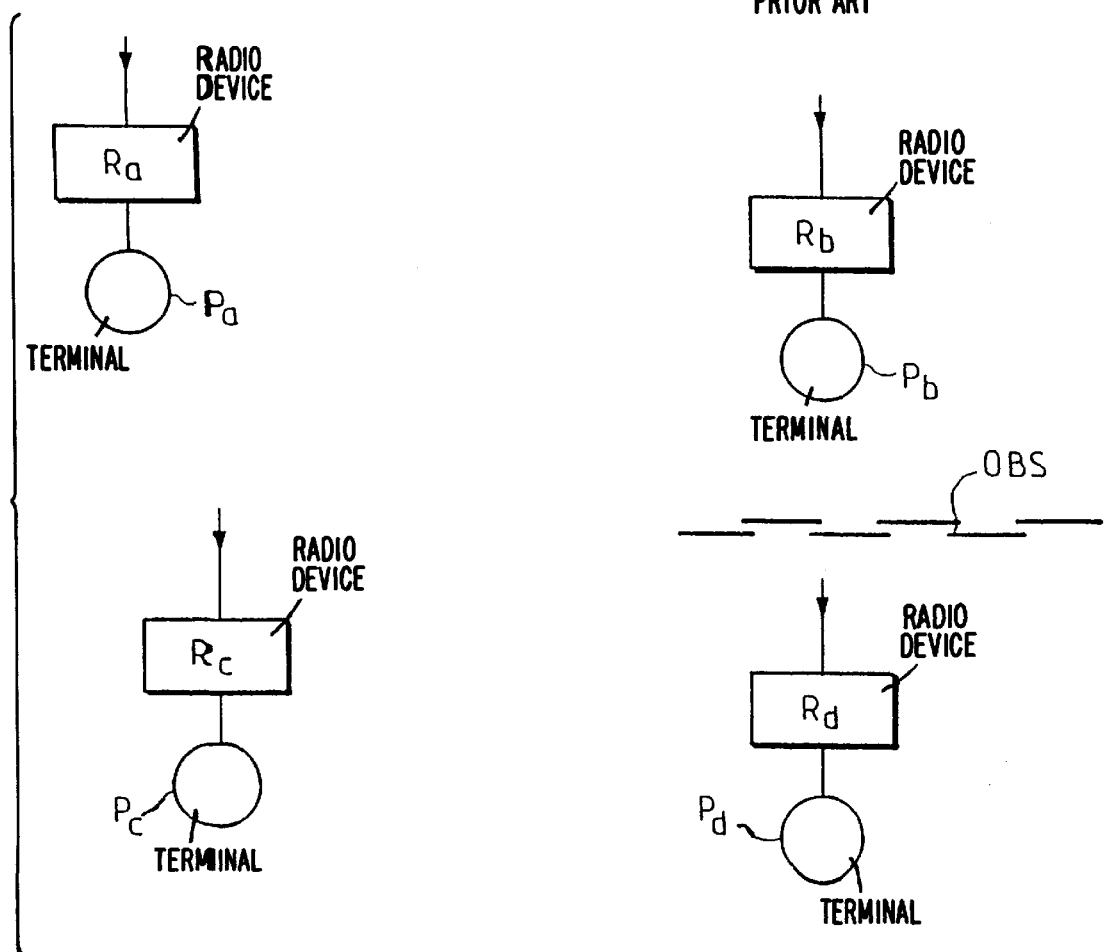
FIG. 2 is a highly simplified diagram illustrating four stations interconnected by radio transmission.

In FIG. 2, the terminals or stations Pa to Pd are now connected to radio devices Ra to Rd, equipped with antennae. In the simplified example illustrated, all stations may exchange data directly, except for the stations Rb and Rd, between which there is an obstacle OBS.

What is here called a network interface, in a wider sense than for cabled computer networks, is all that which is between the terminal proper and the antenna(e) with which it is equipped.

The term "message" here designates a set of data to be transmitted, of any size. The term "frame" or "packet" designates the basic data transmission unit, that is to say the block of data which may be transmitted together.

One of the distinctive features of the present invention is to arrange that when a terminal wishes to transmit a frame, that terminal is the only one to do this within the area of its radio range.

Figure 3:
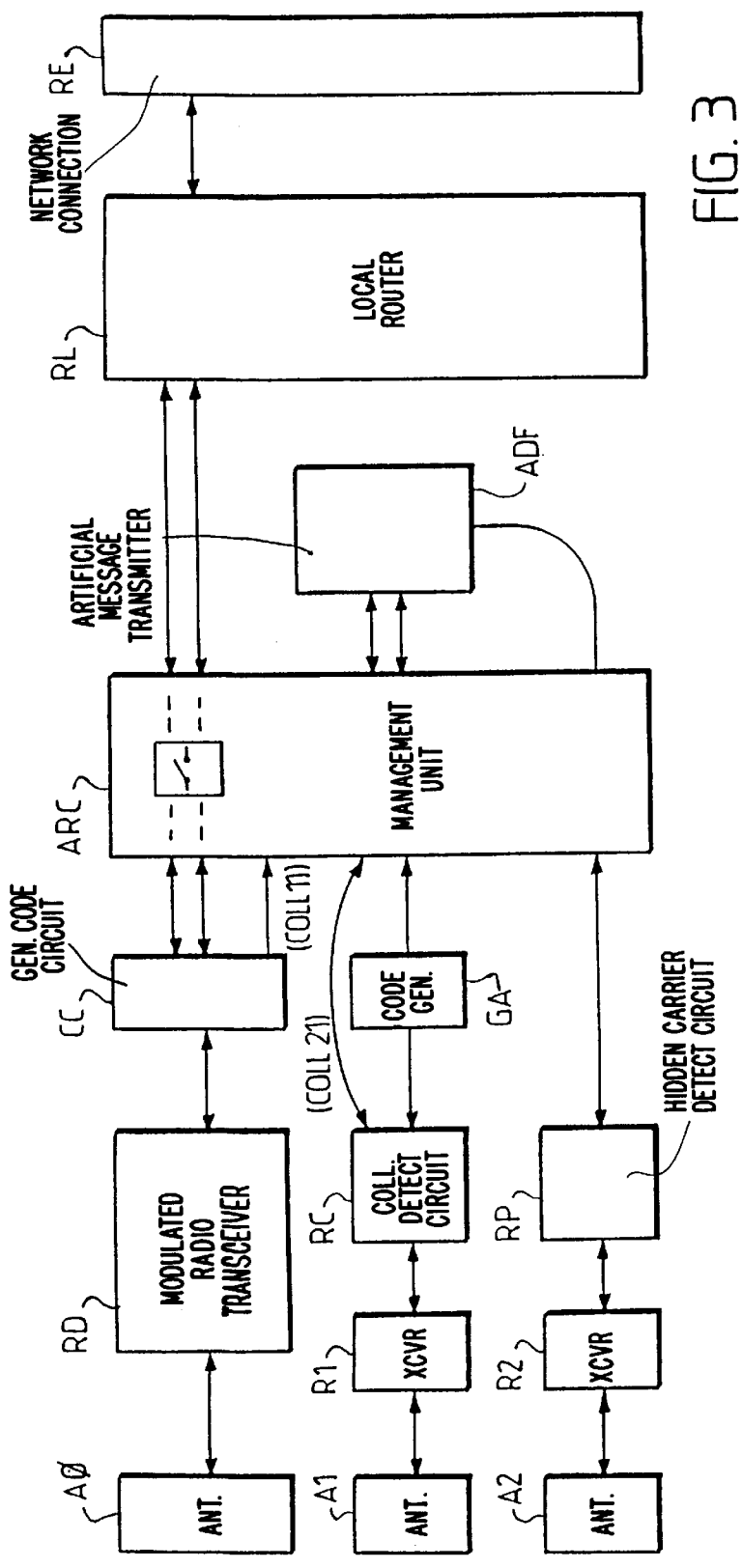
FIG. 3 is a schematic diagram of the entire network interface, for a terminal according to the invention.

Reference is now made to FIG. 3, which illustrates the general structure of a network interface for a terminal.

On the right, the block RE indicates the connection in accordance with IEEE 802, which enables a computer to be connected to a network output. This connection is implemented for example by integrated circuit i82586 sold by the Intel Corporation.

To its left, the block RL is a "local router", the role of which will be specified later. Its function is to set up messages to be transmitted, with transmission requests, and to collect properly received messages, redirecting them if necessary.

Also to the left appears a block ARC, which is the transmission/reception management unit, especially concerning collisions.

A block ADF is attached to it, enabling frequency drifts to be corrected, by transmitting artificial messages, when necessary.

To the left of the block ARC, at the top there is a main channel, made up from a transmission/reception antenna A0, a modulated radio transceiver, marked RD, for data transmission, and a circuit CC, the function of which is, on transmission, to supplement the message with correction codes and, on reception, to verify the correctness of these codes to detect possible errors in a message (otherwise received normally, that is to say without collision).

On the left and in the middle is a first side channel, equipped with a transmission/reception antenna A1, a transceiver R1 with rapid transmission/reception switching, and a circuit RC for the radio detection of collisions.

There is also a block GA which operates as a pseudo-random code generator, such codes being used for different purposes according to the invention, both by the circuit RC and by the aforementioned block ARC. The blocks RC and ARC are directly interconnected.

Finally, on the left and at the bottom, a second side channel is shown with its antenna A2, its receiver R2, and a circuit RP, which enables the radio detection of "hidden carriers".

The functional decomposition which has been carried out in FIG. 3 will not always be adhered to subsequently, with the aim of facilitating understanding.

Figure 3A:
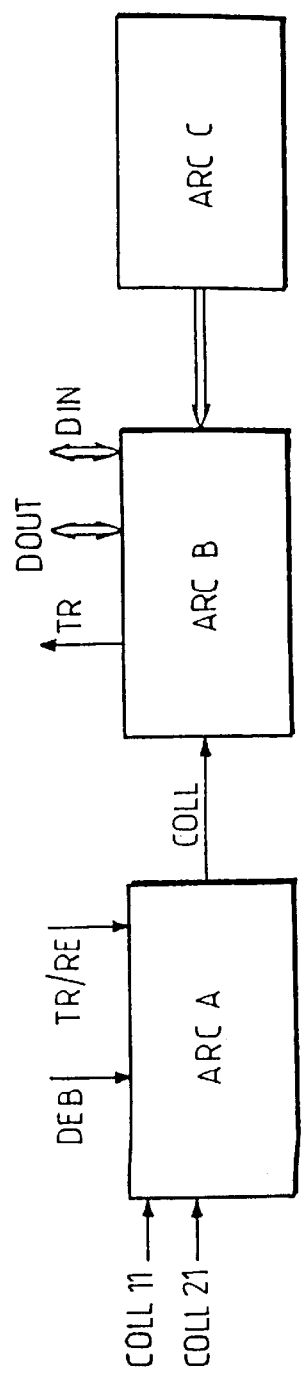
FIG. 3A is a partial detail of FIG. 3.

Thus the block ARC may be broken down into three blocks ARCA, ARCB and ARCC, as shown in FIG. 3A. The block ARCA is responsible for managing the detection of collisions, and making use of the results of this. The block ARCB is used for resolving collisions, and generating instructions confirming data transmission or reception. This block ARCB will incorporate a mechanism for resolving collisions, which may be of any known type. Finally the block ARCC will, in collaboration with the block ADF, be responsible for providing transmission of artificial messages.

Reference is now made to FIG. 4.

FIG. 4A illustrates the conventional format of an ETHERNET message in accordance with IEEE 802.3.

The present invention makes provision for the message to be supplemented, if desired, by the additional information which appears on the right of FIG. 4B. It comprises on one side an indication of relay destination and relay source, a so-called LARA code (this term "LARA" being assigned to the new protocol according to the present invention), and a buffer area which may contain additional information.

When provision is made for several relays, the buffer area contains, as shown in FIG. 4C, first a code indicating that this is a point-to-point transmission, that is to say from a single transmitting terminal to a single destination terminal, and then an area indicating the number of skips already performed by the frame in the various relays it has undergone since the initial transmitting terminal. This buffer is updated on each skip or relay of the frame.

Conversely, a message may be transmitted by one terminal destined for several terminals, which will be called a "broadcast". In this case, as illustrated in FIG. 4D, the buffer area is increased, in order to include a code indicating that it is a broadcast, the number of relays, and the destination addresses of the various relays 1 to n, a broadcast message number, and the number of skips performed by the frame in its previous relays.

What has just been described is the structure of a "frame" of messages. In a simple example, each frame is composed of two parts, namely the header, and the body of the packet. The header contains as a minimum the destination address (es), and the sender's address, as well as some specific information concerning the traffic (for example the need or otherwise for an acknowledgement). The body of the packet contains the data to be transmitted (file, acknowledgement), and the packet end signals.

These frames or packets are forwarded one by one from the block RE of FIG. 3. The block RL will process these packets, essentially in cases where a destination is not within radio range of the sender; it then modifies the header by adding the address of an intermediate station, as illustrated in FIG. 4B. The packets are then taken control of by the block ARC, which decides on transmissions and interrupts them in the event of a collision being detected. The coder CC and the device RD take control of the actual transmission of frames in the ether. When a frame has been correctly transmitted without collision, a signal is transmitted to the block RE, to enable the next packet to be taken.

On reception, the operation takes place in reverse. The block CC will verify the correctness of the packets received; preferably, packets with errors will simply be destroyed.

The block RL determines if the message has reached its destination, or if it is in the process of communication or relay. A message which has reached its destination is transmitted to the block RE, while a message to be relayed, has its header modified, if necessary, to take account of the relay, and returns to the block ARC for re-transmission.

The international standard ISO—IEEE 802 makes provision for partitioning into communication function layers.

The functions situated from the antennae to the block ADF inclusive constitute an adaptation to the radio transmission of the functions conventionally called the "Medium Access Control" or MAC layer. In accordance with the present invention, a new layer is then introduced, which corresponds to the block RL, and which may be called the "membership and routing" or MR layer. At the level of the block RE, the conventional ETHERNET interface layer is found.

There will now be a discussion of the so-called MAC layer, which will be described in detail.

First of all, a precise data transmission method must be applied at the level of the block RD. In effect this is converting a digital binary sequence into an electromagnetic signal suitable for radio propagation via the antenna, and vice versa, which is generally more difficult.

The intended aim is to provide maximum electromagnetic protection to the digital sequence which must pass between a transmitter and a receiver; in particular it is necessary to combat the phenomena of interference or multiple routes as effectively as possible. On the other hand, it is pointless to combat interference from possible transmissions from other terminals on the network, since that is the criterion which will enable confirmation of the existence of a collision, and then its resolution.

Thus, the block RD may operate by spectrum spreading with a unique code for all stations on the same network, where this unique code may be a pseudo-random code common to all the stations, and detected by a matched filter on reception. That is only one example.

Moreover, it will be noted that it is necessary to ensure proper frequency synchronisation between the various terminals involved. A person skilled in the art knows how to ensure this synchronisation in the event of sufficient traffic. When this condition is not complied with, the drift between the various master oscillators may become such that synchrony can no longer be recovered very rapidly. A solution to this problem will be proposed later.

Generally, radio reception will be considered as demodulatable if its gain on reception is greater than or equal to a threshold value $e_d$. If the gain is less, the received signal is considered to be "received with errors". Advantageously, a value $E_d$ is defined, which corresponds to "in the immediate proximity" reception (this is used particularly in routing, described later). This definition of a threshold common to all stations or terminals assumes that the receiving power is the same for all, which is generally accepted here.

In transmission mode, the function of the circuit CC is to convert the frames in accordance with IEEE 802 into binary sequences more resistant to transmission errors, in particular because of the use of error correction codes (for example interleaving, associated with the use of a convolutional code).

In receiving mode, the component restores the initial frame, correcting any transmission errors in the binary sequence received from the radio data receiving device (when this has demodulatable reception available).

Moreover, it detects any errors residual to processing the reconstituted frame, and signals these errors. A "frame received with errors" state may result from this.

Preferably, two error detection and correction coding methods are used:
  one for "scattered" errors (VITERBI coding),
  the other, handling block errors (REED-SOLOMON coding, with interleaving).

This assumes the use of the said coding methods on the first transmission of the data (at least), and the use of verification processing on (each) reception.

This coding method or methods may be supplemented by an interleaving technique where the order of the bits in each sequence of bits sent is modified substantially after coding; in this way, a short perturbation affects only information bits which were very distant from each other in the original sequence. The normal order is, of course, re-established after reception before carrying out the error correction decoding.

It is also possible to improve things even further by taking into consideration physical data such as instantaneous radio reception gain, or else statistical considerations on the various antennae or multiple propagation routes.

Provision is made in the block CC, upstream of its coder section, for an elementary device for rapid error detection, like division of the frame into satisfactory quantities by parity bits. On reception, the error checking operation (parity checking for example) is carried out downstream of its decoder section.

Figure 5:
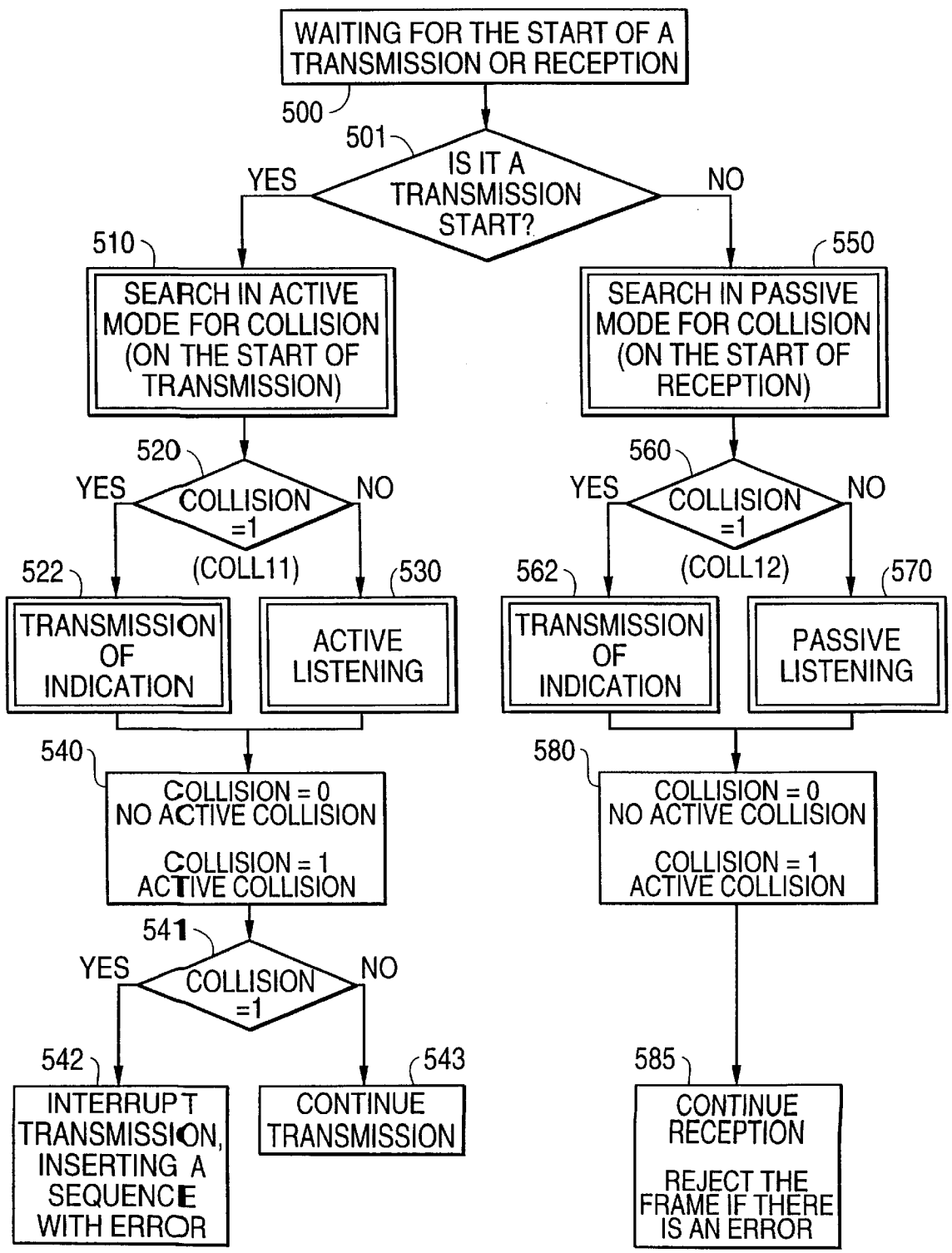
FIG. 5 is a functional diagram of a mechanism applicable to collision detection.

Reference is now made to FIG. 5 for the description, in procedure form, of the implementation of the invention.

In FIG. 5, step 500 indicates the wait for the start of a transmission (emission) or a reception.

On such a start, step 501 tests whether it is a transmission or a reception.

Figure 6:
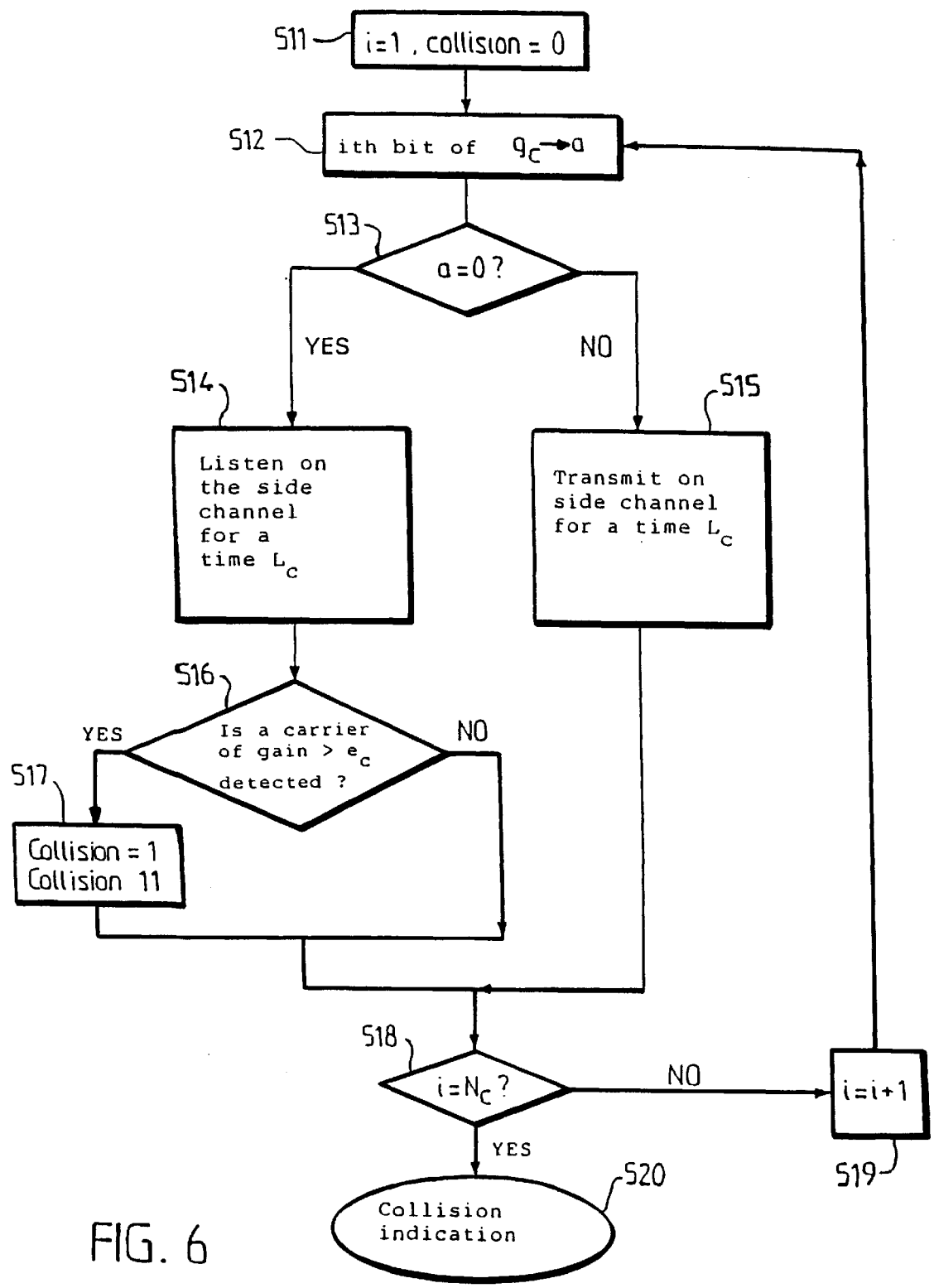
Figure 7:
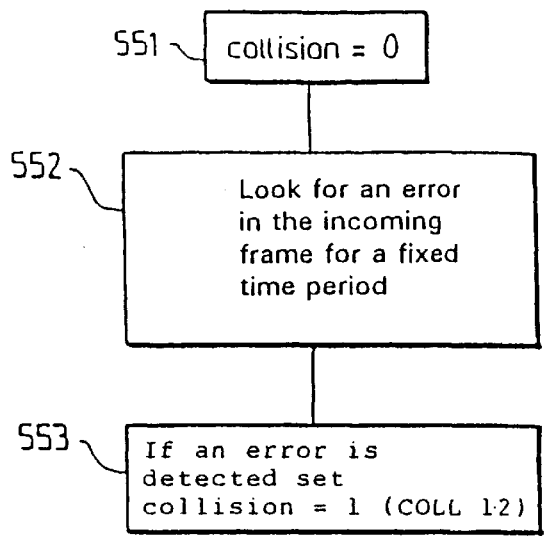
FIGS. 7, 8 and 9 are other more detailed functional diagrams, relating to parts of the mechanism of FIG. 5.

If it is a transmission, move to step 510, detailed in FIG. 6; conversely if it is a reception, move to step 550, detailed in FIG. 7.

In either case, the following steps, 520 and 560 respectively, determine whether a collision condition has been recognised, which is marked by logic signals COLL11 and COLL12, respectively (0=false; 1 =true).

If there is a collision, move to steps 522 and 562 respectively.

In the absence of collision, move to active listening step 530 if at the start of a transmission, and conversely to passive listening step 570 if a reception. These steps 530 and 570 are detailed respectively in FIGS. 9 and 8. As a variant, passive listening is carried out in both cases.

Next, move to steps 540 and 580 respectively, to determine a collision state according to the result of the previous step.

In one case, the terminal was starting transmission. Step 541 determines the presence or absence of collision. When there is a collision, the transmission is interrupted, preferably after insertion of a sequence provided with a parity error, on a special command sent to the block CC, as shown at step 542. In the absence of collision, the transmission continues as shown at step 543.

In the other case, the start of a reception was involved. In the absence of collision, this continues at step 585 with, however, rejection of the current frame if it has a parity (or other) error.

The detail of step 550 is relatively simple, and will be described here now with reference to FIG. 7. At the beginning, sub-step 551 sets up a false collision condition (COLL12=0). At step 552, the block CC looks for any parity (or other) error in the incoming frame, for a fixed time period. At sub-step 553, the signal COLL12 is set to 1 if such an error is detected.

More complex, the detail of step 510 will now be described with reference to FIG. 6.

The pseudo-random generator GA (FIG. 3) has supplied a pseudo-random word Gc having Nc bits.

At step 511, a processing index i is initialised to 1, while the variable COLL11 is set to the value 0, representing collision "false".

Step 512 consists of taking the ith bit from the word $g_c$, which will be designated by a.

Step 513 tests if the bit is 0 or 1. If it is 1, step 515 consists in transmitting on the first side channel for a time $L_c$. If it is 0, step 514 will instead listen on the first side channel for the time $L_c$.

At step 516, a test is made on whether a carrier of gain greater than a threshold value $e_c$ has been detected. If yes, this is because another station has transmitted at the same time (based on a different pseudo-random word). In this case, step 517 consists of setting the variable COLL11 to 1.

In either case, return to test 518, which determines if the last bit of the pseudo-random word GC has been reached. If this is not the case, step 519 increments the working index i, and a return is made to 512.

The final exit consists of moving to the following step of collision indication, which is step 520 of FIG. 5.

Advantageously the carrier detection of step 516 is not carried out immediately from the start of the listening time interval defined at step 514. Preferably a wait of time $l_c$ is effected, so that the collision detector cannot be deceived by the echo of its own transmissions.

Furthermore, it is arranged that the transmission of step 515 appears continuously when two consecutive bits of the pseudo-random word $g_c$ are at one.

What has just been described concerns the first step of operation of the automatic collision detector, a step which may be taken in either an active state, or a passive state, according to the result of test 501 of FIG. 5.

The second step follows the first, after a silence. This silence is preferably at least equal to $L_c$. In all, the second step therefore starts $(N_c+1) * L_c$ time units after the start of operation of the automatic collision detector.

During the second step, this automatic device exhibits at least two states, namely a transmission state to indicate or "broadcast" the collision and a listening state. Preferably it has three states, where the listening state may be passive listening or active listening.

Two new reference quantities are now considered, which are a threshold of level $E_c$ at least equal to the threshold $e_c$ already referred to. A new time constant $J_c$, greater than the time $L_c$, is also considered.

When a collision has been detected (COLL11=1 or COLL12=1 respectively) in the local terminal, the global steps 522 or 562 respectively of FIG. 5 consist of transmitting a predetermined signal, such as a pure carrier, on the first side channel for $J_c$ time units.

Figure 8:
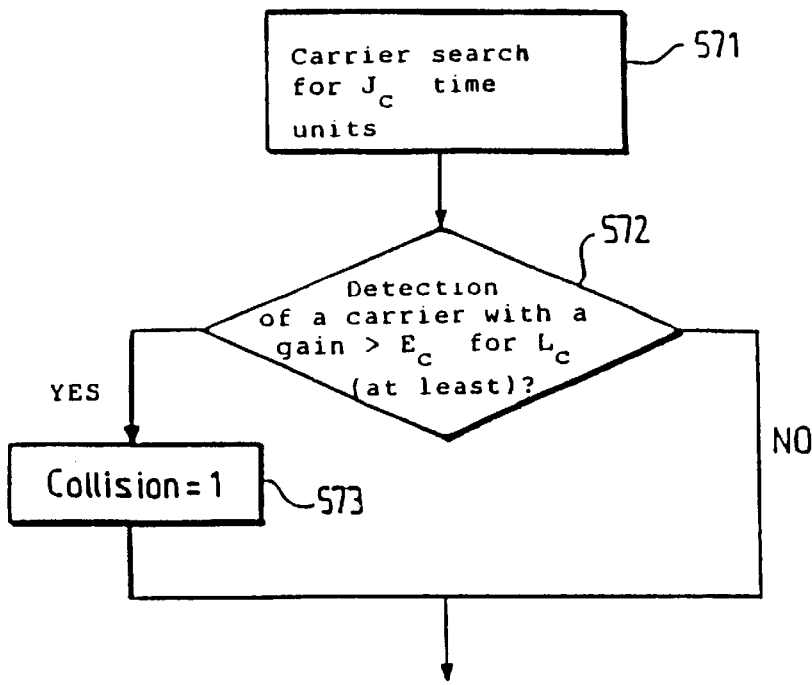
Figure 9:
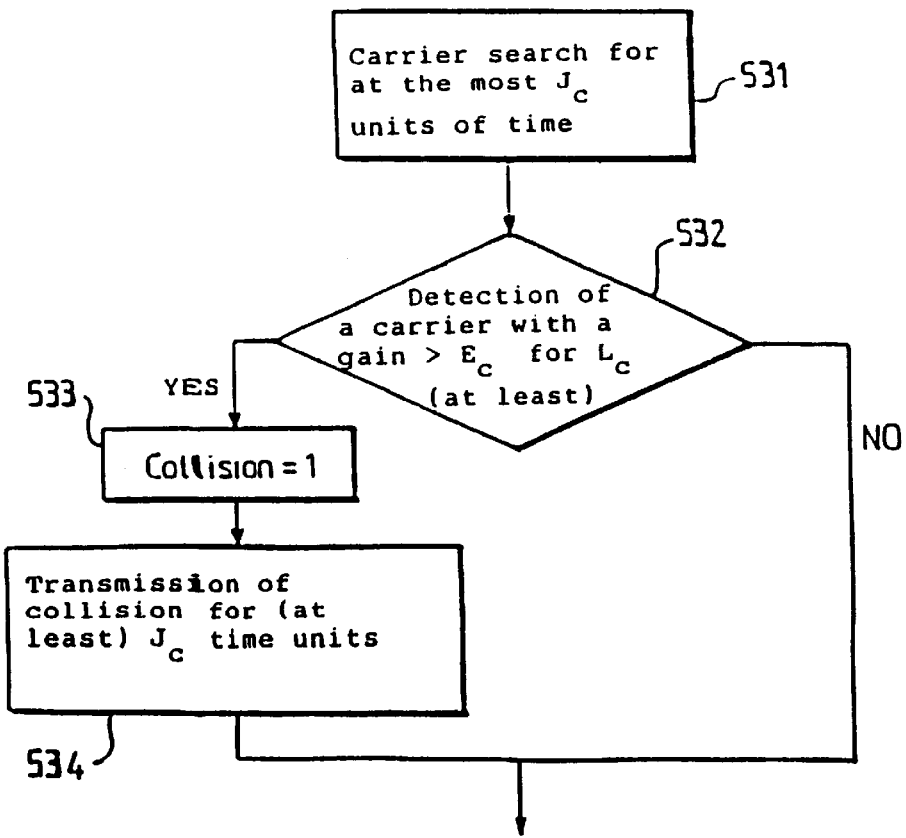

The passive listening of the global step 570 is detailed in FIG. 8: the sub-step 571 consists in listening on the first side channel for $J_c$ time units; the sub-step 572 searches on this channel for a carrier with a gain greater than $E_c$, for a substantial time, at least equal to $L_c$; if such a carrier is detected during the time thus defined, step 573 sets a collision variable COLL22 to 1.

In a way, each station defines an (irregular) transmission/reception comb which is peculiar to it. $L_c$ is the clock used to define this comb. $L_c$ must be chosen to be greater than the time during which echoes are received after transmission (fading). $J_c$ is a time (in principle predetermined), chosen sufficiently large so that, when there is a collision, all stations concerned may be aware of it.

If the terminal was transmitting previously, but has not detected any collision, it may carry out passive listening. Preferably, it starts active listening, as shown at step 530 in FIG. 5, and detailed in FIG. 9. Steps 531 to 533 in the latter are identical to steps 571 to 573 in FIG. 8. Active listening consists simply of adding, when there is a collision detected at step 533, a step 534 which modulates a carrier signal on the first side channel R1, for at least $J_c$ time units, in order to indicate a collision.

Figure 6A:
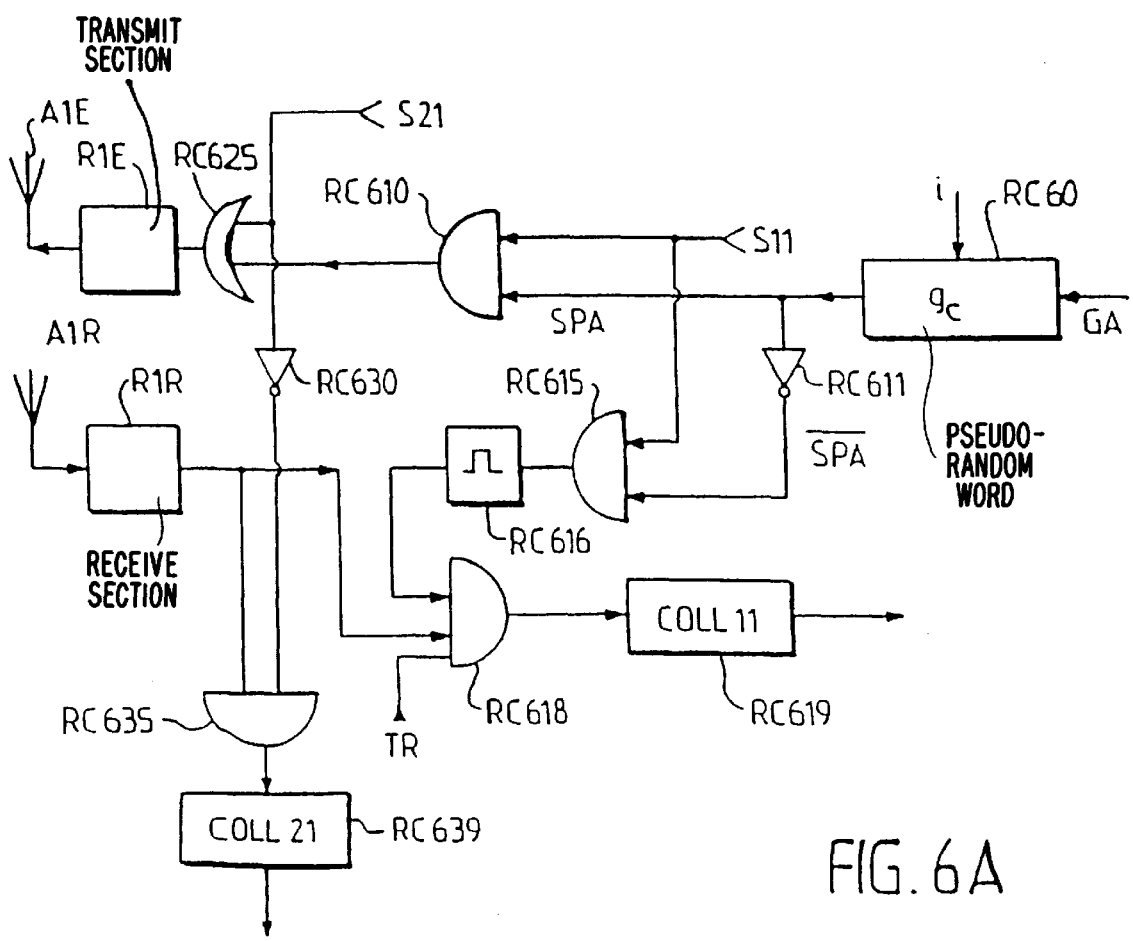
FIG. 6A is an equivalent electrical diagram, corresponding to FIG. 6, and FIGS. 6B and 6C show a variant thereof.

FIG. 6A illustrates by way of example a physical implementation corresponding to step 510 of FIG. 5. The antenna A1 and the receiver R1 of FIG. 3 are here broken down into a transmit section A1E, R1E and a receive section A1R, R1R. The block GA has constructed a pseudo-random word $g_c$. This word may be stored in a register RC60, receiving clock pulses which define the processing index i.

The two successive steps of the automatic collision detector are now considered, with the active state.

During the first step, the signal S11 is true and the signal S21 false. The two AND gates RC610 and RC615 are therefore enabled. Furthermore they receive respectively the current bit output from the register RC60 and its complement produced by the inverter RC611. If the bit is 1, the transmitter R1E is activated. If the bit is 0, and after a delay defined by a stage RC616, the output of the receiver R1R is monitored, a logic signal COLL11 being defined by an AND gate RC618. If a transmission is obtained while the current bit of the word GC is at 1, and after the delay $1_c$ already mentioned, COLL11 is true (COLL11=1 in memory RC619).

During the second step of the automatic device, the signal S21 is true, in the event of collision already detected locally, and the transmitter R1E is activated via the OR gate RC625. If it is false, after being complemented by the inverter RC630, the output of the receiver R1R is monitored, by means of an AND gate RC635, which determines a collision condition COLL21, stored in memory RC639, and corresponding to listening (passive, in this FIG. 6A).

Then there is the matter of a collision which the terminal is informed of by another terminal, without having detected it itself. The surveillance may be purely passive, or active, according to predefined criteria, which may be other than those stated above, and depend in particular on the method of collision resolution chosen.

If it is necessary (active listening) to repeat the transmission so that it lasts for a well determined time, it is sufficient, for example, for the duration of the signal COLL21, to directly control the transmitter R1E to achieve the desired extended transmission in the first side channel, on the pure carrier, of "indication" or "broadcast" of the existence of a collision.

Figure 6B:
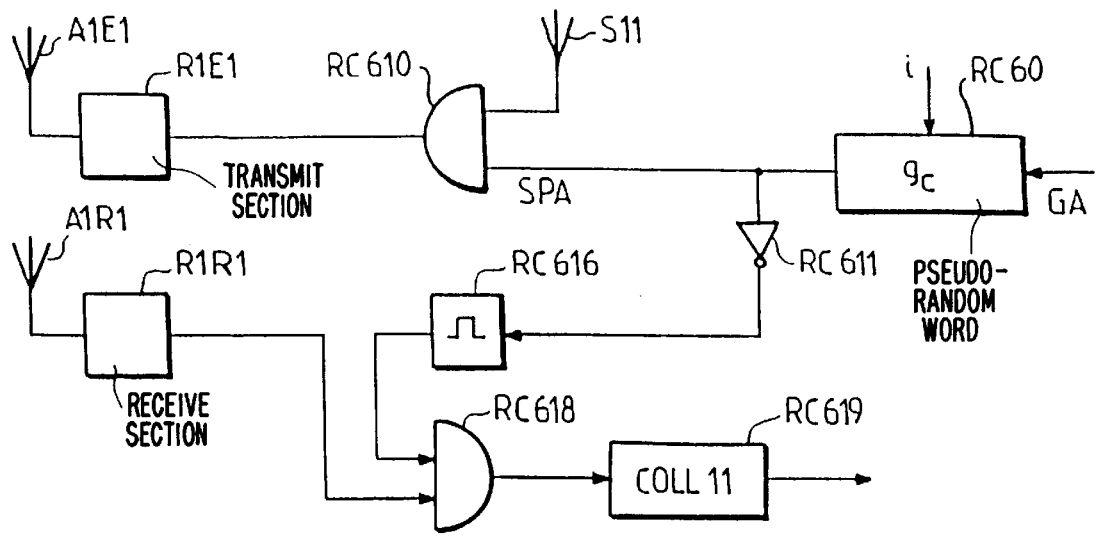
Figure 6C:
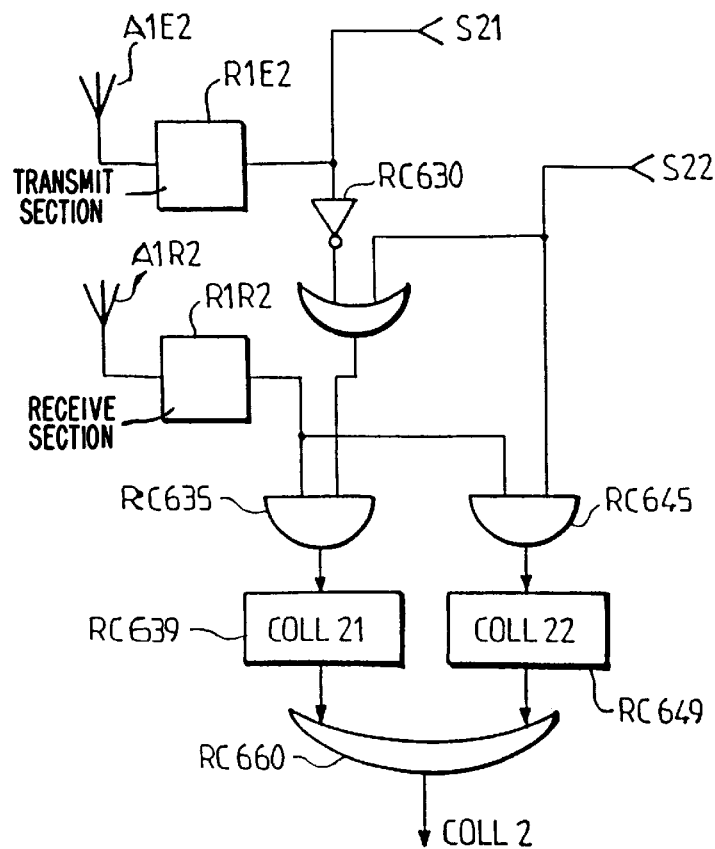

FIGS. 6B and 6C illustrate a variant where the first side channel has been split into two distinct "first" side channels, suffixed 1 and 2 respectively in their transmit and receive sections. Circuit simplifications follow from this. FIG. 6B concerns the first step of the automatic device, in the case of a station which has transmitted. FIG. 6C concerns the second step of the automatic device, where (simply for the illustration) the case of S21 for stations which have already recognised the collision, and that of S22 for stations which have not yet recognised it, have been distinguished. The elements of the two paths RC635 and 645 followed by RC639 and 649 are the same. An OR function RC660 combines their outputs COLL21 and COLL22 into COLL2.

The operation is as follows:

The two steps S1 and S2 may take place simultaneously: listening may be by R1R2 during the first step, which takes place as previously with R1E1 and R1R1 for an active station. Any detected collision forces immediate transmission by R1E2.

The functions which come under the second (or third, depending on the case) side channel will now be described with reference to FIG. 10. As previously (FIG. 6A), the antenna A2 and the radio stage R2 are subdivided into transmit sections A2E, R2E and receive sections A2R, R2R. Likewise, for the main channel, its receive section A0E and RDE is separated from its transmit section A0R and RDR. In the block CC, its transmit section CCE and its receive section CCR are also distinguished.

In the receive case, the coder CCR supplies both data and an indication RE that it is receiving (signals demodulatable by the stage RDR). The signal RE forces the transmission of an engaged signal by the stage R2E of the second side channel, signifying that the ether is busy, for all terminals in radio range.

Conversely, apart from this case of demodulatable radio reception, the receive section R2R of the second side channel is designed to detect the existence of such an engaged signal transmitted by another terminal (above a level threshold), and then supply a logic signal BP=1, indicating occupation of the ether on the main channel.

A logic AND function LL200 receives the basic transmit instruction TR, and the signal BT complemented (the complementing is indicated by a small circle on the input of the gate LL100). The basic transmit instruction TR therefore becomes the instruction confirming transmission TRE only if no engaged signal BT is received. If TRE is true, the transmitter stage RDE is enabled to transmit packets or frames of data, which it receives after appropriate conversion from the transmission coder circuit CCE.

The engaged signal may be used in several ways:

in the embodiment described, it is transmitted by all terminals receiving a demodulatable signal;

a first variant consists of interrupting this signal as soon as a receive error is noticed; in that case, the absence of an engaged signal may serve as a collision indicator, possibly even being the only one, under certain conditions;

in a second variant, only the (primary) message destination station(s) transmit the engaged signal (according to preference, all or none have transmitted at the start, during the time needed to decode the destination);

another variant consists of transmitting an engaged signal when the signal received is not only demodulatable but also decodable. In this case, collision may be defined by the fact that no engaged signal is emitted when there is a transmission.

Certain of these variants may be combined.

Reference is now made to FIG. 11A, which describes section ARCA of the block ARC of FIG. 3.

A sequencer ARCA10 defines steps 1 and 2, as a function for example of a logic start signal DEB and a logic signal TR/RE indicating whether a transmit or a receive is involved.

Logic signals S1 and S2 representing respectively the first and second steps of the automatic collision detector are derived from these. If transmission is occurring (TR), a logic gate LL300 sets a signal S11 true (first step, active state). This signal S11 drives the circuits of FIG. 6A already described. In return, these may provide a collision signal COLL11, detected on a local transmission.

If reception is occurring, an AND gate LL310 is involved. It has an input receiving the signal RE representing reception, an input receiving the signal S1 and a third input receiving the signal REOK, complemented. Reception of an incorrect frame will produce a detected collision logic signal COLL12, representing a collision during reception, attributable to other terminals.

An AND gate LL320 combines the signals COLL11 and COLL12 into a signal COLL1, stored in a memory LM325 (local collision detection). If a collision is stored as COLL1, a gate LL30 combines the signals COLL1 and S2 to restore the state of transmission on collision in the second step, by a logic signal S21=1.

Otherwise (S21=0), active or passive listening will provide a collision signal COLL22=1 if necessary. It indicates a collision recognised by other terminals, but not detected by the local terminal. The combination by an OR function LL335 of the signals COLL1 and COLL22, stored in LM340, provides the signal COLL defining detected collision.

The elements which have just been described may be the subject of different variants.

First of all, effecting collision detection in receiving mode only, under certain circumstances, may be envisaged. In this case, the device managing the pseudo-random alternate transmission/receptions on the first side channel may be omitted.

Then, the collision does not always occur at a packet start. In fact an error may be found in the course of a packet ("late collision"). In this case, predefined criteria determine whether a collision is indicated or not: simplifying, it may be decided in principle always to indicate a late collision, or conversely never to indicate it.

Figure 11B:
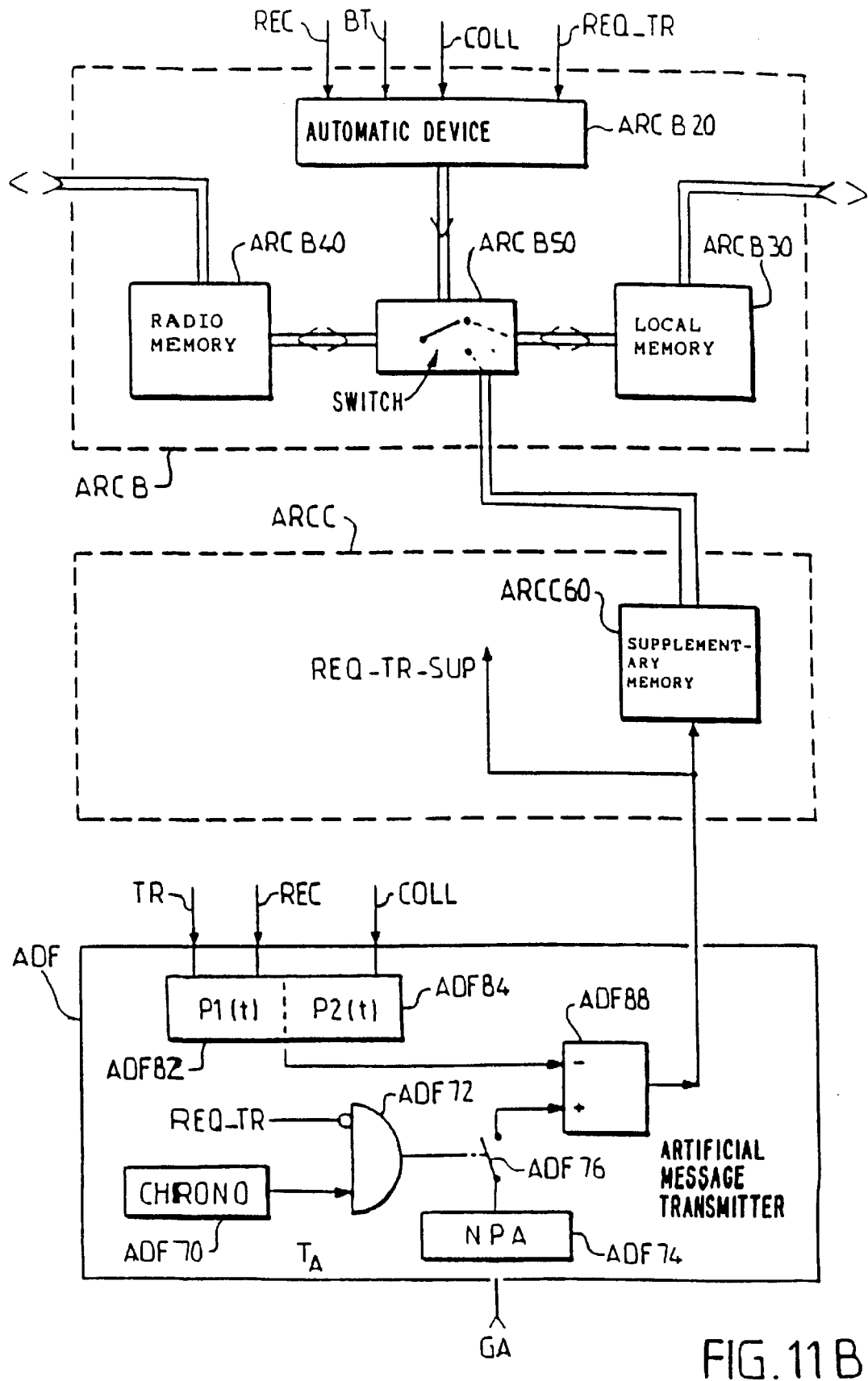
FIG. 11B is an equivalent electrical diagram of the other parts of the transmission/reception management device of a terminal.

FIG. 11B illustrates the general functions of collision resolution in a simplified manner.

The minimum signals required are:

a current transmission request signal REQ_TR, a current receive signal REC, a data channel engaged signal BT, and the collision to be dealt with signal COLL.

All these are applied to an automatic device ARCB 20, which operates in accordance with a known collision resolution method, such as BEB ("Binary Exponential Backoff"). As a variant, this may be one of the methods recently introduced to implement deterministic collision resolution, that is to say in limited time. Advantageously, it is the method of collision resolution described in the aforementioned Patent Application.

Schematically, the block ARCB comprises a local frame memory ARCB30 and a radio frame memory ARCB40, with a switching mechanism ARCB50 between the two, which enables:

processing of the received signals, if usable signals are actually being received, a decision on whether there is a right to transmit, in the absence of collisions, resolution of a collision, determining when an attempt to transmit is going to be made, and indicating at what time this transmission on collision attempt will be considered successful, that is to say, not itself generating a collision.

According to an advantageous aspect of the invention, the switch ARCB50 of FIG. 11B also receives signals from a supplementary memory ARCC6O, which contains artificial messages which will be reconsidered later. A supplementary transmission request signal REQ_TR_SUP is of course associated with it.

Before explaining the main purpose of these artificial messages, the operation of the radio transmission/reception devices should be reconsidered briefly.

These devices generally suffer from what is called frequency drift: the oscillatory devices—quartz and others—suffer frequency variations, which may be enough to compromise receiving efficiency. Of course, it is known how to adjust such devices, so that when a receiving device is shifted in frequency with respect to its transmitter, the receiver readjusts itself automatically onto the latter in a lock phase. This lock phase has a tolerable duration when the initial shift is small. On the other hand, it could become extremely long if this shift is large, and thereby compromise the operation of a radio computer network.

The Applicant therefore came to the conclusion that it is desirable, when the radio traffic is insufficient to ensure a sufficiently short time for synchronising receptions to transmissions, to artificially increase this traffic by means of artificial messages.

In this case a considerable difficulty arises: the artificial traffic must provide a continuous and not insignificant flow to ensure a continuous re-adjustment of the various radio transceivers. But it must also be able to be removed very quickly when natural traffic becomes sufficient again. In addition, in achieving this, account must be taken of the special characteristics of the radio transmission medium, which is a distributed transmission medium, capable of many different configurations.

After analysis of this situation, the Applicant considered that it was necessary to provide a suitable statistical balance of transmission/reception: in other words, it is necessary for the sum of natural and artificial traffic flows to be equal to a quantity established in advance. But it is also necessary for this property to be complied with in each of the cells (range areas) surrounding each terminal or station. A person skilled in the art will then understand that the theoretical resolution of this problem implies calculations of great complexity, which cannot be used in real time and in situ without seriously compromising the operation of the network.

A compromise solution which appears to be satisfactory will therefore be proposed here.

The block ADF is responsible for determining the way in which the transmission of artificial messages must be produced.

This block ADF (FIG. 11B) is linked to a chronometric circuit ADF70, which defines control times with a periodicity TA (step 700, FIG. 12). For example, pulses of period $T_A$ are applied to an AND function ADF72, which also receives the local transmission request signal, complemented, REQ_TR/ (the final oblique line indicates a complemented signal). If, at time $T_A$, there is no local transmission request (test 702), then the switch ADF76 will be closed to enable a register ADF74 to supply a pseudo-random number NPA, which has been obtained (704) from the generator GA of FIG. 3. This pseudo-random number is applied to the negative input of a digital comparator ADF88.

The current value of the pseudo-random number NPA is termed g(t).

In parallel, the combination of blocks ADF82 and ADF84 maintains a probability quantity p(t). The quantity p(t) is sent to the positive input of the digital comparator ADF88.

If the comparator indicates (test 706) that g(t) is less than p(t), then the supplementary transmission request REQ_TR_SUP will be generated, to request transmission of artificial messages (708).

If there is a frame of real data awaiting transmission in the circuit ARCB, the output of the comparator ADF88 will simply be inhibited.

Definition of the quantity p(t) is linked to the observation of the transmission medium or channel, for which a limited number of different states or rather "observations" is compulsory, one and only one of which is valid at any instant.

The observations may be:

collision slot, vacant slot, transmission in progress (transmit or receive).

A way of defining these observations is described in the patent application of the same date already referred to.

The quantity p(t) is defined recurrently from its previous value and the observation of a change of state of the channel.

At each state observation (changes of state as well as a new occurrence of the same state—for example a new collision, while already in the collision state), p(t) is updated according to its previous value and the observed state:

$$h[p(t), o] \rightarrow p(t)$$

where "o" designates the observed state.

Any function h[] which ensures that p(t) decreases in the event of an abundance of collision slots and increases in the event of an abundance of vacant slots can be suitable.

With the three states defined above, and the collision resolution method of the parallel application of the same date, the Applicant at the moment considers it preferable that:

$h[p(t),\text{"collision"}]=\text{MAX } \{f_m, a * p(t) \}$ (step 806)

$h[p(t), \text{"vacant"}]=\text{MIN } \{F_m, b * p(t) \}$ (step 804)

$h[p(t),\text{"transmission"}]=p(t)$, as indicated by the direct return of step 702 to 700, where:

a and b are two constants, with a less than 1 and b greater than 1, $f_m$ and $F_m$ are two other constants, with $f_m$ less than $F_m$, itself less than or equal to 1, MIN{} and MAX{} are two functions giving respectively the minimum and the maximum of two values.

The contents of the artificial messages remain to be defined.

These may be purely artificial, that is to say composed only of zeros, for example.

They may be used to transmit routing information which will be reconsidered later.

Again, they may be used to transmit information used for the recovery of data, when these are transcoded, which may be carried out in different ways.

The functions of the routing handling block RL of FIG. 3, which corresponds to the new so-called "MR" layer, proposed according to the invention, will now be described. Reference is also made to FIGS. 4 for the message formats.

First of all it should be stated that the standard IEEE 802 connection or RE (FIG. 3) recognises, as a minimum, messages with the format given in FIG. 4A.

As regards frames to be transmitted, therefore, the first function of the block RL is to examine the destination address contained in the header of FIG. 4A. The block RL then refers to its local routing table. If necessary, it will modify the header of the frame, so that the latter is transmitted to an intermediate station which is within radio range. The format of the packet or frame is then that of FIG. 4B.

This done, the complete frame is sent to the block ARC, to handle transmission, resolving any collisions.

On reception, when a frame is received without error, the block ARC sends it to the block RL, which first of all determines whether the transit or relay address contained within the header is indeed that of its local station. If this condition is not met, the frame may be ignored.

If the transit destination is the same as the actual destination, the frame has reached its destination, and is sent directly to the block RE, after correction of its header to change from the format of FIG. 4B to the format of FIG. 4A.

In the converse case, the router does exactly as if the frame had been obtained from the connection RE, with transmission request: it refers to its local routing table, and again modifies the frame header, in order to write into it a new intermediate station, or else the final destination, after which the frame is sent back to the block ARC. It would be possible for a copy of it to be submitted to the block RE, for information.

The local routing table remains to be defined. This may come from an initialised or preset version, but it is desirable to update it continuously. This updating may be carried out from frames received normally from the block ARC.

Each frame received normally has an indication of its immediate sender. It is therefore possible for the block RL to continuously maintain a table of neighbouring terminals or stations which it receives. Furthermore, at regular intervals, the block RL will create a spontaneous frame, by which it broadcasts to the other stations in its radio range at least some of the contents of its routing table (stations which it receives). This spontaneous frame may be incorporated in the artificial traffic when this is created. It may be created on its own accord when there is no need for artificial traffic.

The result is that each station knows of itself the stations it receives, and, from transmitted information, the stations which receive it. From this there is the possibility of constructing two tables, which will be called:

transmission register (the stations which it hears)

reception register (the stations by which it is heard).

For a given terminal (denoted A below), stations which are in both registers are in a "symmetrical range" relationship with this terminal. Routing will be able to take place only through stations complying with this symmetrical range condition.

From this, each terminal A will be able to communicate directly (one transmission) with its counterparts with "symmetrical range", indirectly (two transmissions) with other terminals with "symmetrical range" from the first, which serve as relays, and so on. It is conceivable to set a limit to the number of relay stations allowed, which will be called "number of skips" below.

It is now possible to construct a third table which will be called the "topological directory" for each station. This directory is a matrix which is rectangular or has two inputs with, for example, the numbers of the stations written in A's transmission register, that is to say which directly receive the current terminal, as columns, and the numbers of all the stations which are accessible from the current terminal, as rows. Each cell of this table will contain the number of skips necessary to reach the station ultimately aimed for.

A person skilled in the art will understand that the updating of this topological directory may be done from the routing tables received by the station under consideration from other stations which are within radio range.

In order to carry out this updating, it is sufficient to consider any decodable frame received "on the fly" by this station, examining in its frame headers what the intermediate source is, what the actual source is, and the number of skips already carried out by the data packet under consideration.

In fact, the buffer area of the message format of FIG. 4B comprises as a minimum at least a code indicating that it is a point-to-point transmission, that is to say concerning only one initial transmitting station and one final receiving station, with the number of skips it is planned to make to move from one to the other.

There again, it is convenient for each station to transmit its routing table at regular intervals, enabling verification of the consistency of the various routing tables of the different stations.

An advantageous variant is "broadcast routing".

This is done on special request, using a particular form for the destination address in the IEEE 802.3 frame of FIG. 4A, for example the fact that this address begins with a 0. This will signify that the message concerns a specific subset of stations of the network, perhaps even all stations of the network.

In this case it is necessary to have two additional tables:
a broadcast table, and
a broadcast index.

The broadcast table contains the numbers of stations with symmetrical range, or a subset of these (this subset having to comply with the property that in the broadcast table there is always a station which enables any of the stations of the network, or any of the stations aimed at by the broadcast, to be reached).

The broadcast index keeps in memory the broadcast numbers of a number of the latest broadcast communications which reached the local station.

The Applicant considers that it is then advantageous to use the format of FIG. 4D, where the buffer area comprises a broadcast code, the number of intended relays, different destinations, a broadcast number and the number of permissible skips.

The invention may be modified in various ways.

For example, a side channel may be used to detect collisions, for example as described above with reference to the engaged signal, but without having recourse to collision indication by means of a side channel.

Likewise, use of the engaged signal may be made without recourse to collision indication by means of a side channel.

Moreover, the words used here must be interpreted broadly. For example, "initiate a transmission on collision via a side channel" covers the case where a transmission could be modified, in terms of its carrier or any modulation of it, and even the case where transmission is halted. Many transpositions of this type may be envisaged.

We claim:

1. A data transmission installation, of a radio network type comprising at least two data processing terminals, each equipped with a network interface, said interface comprising:
   a management device for the transmission and reception of messages according to a chosen protocol, and
   a routing unit capable of deducing, from at least some of the received messages, which network terminals are at a symmetrical range from said routing unit, a first terminal being at a symmetrical range from a second terminal when said first and second terminals exchange messages without the intermediary of a third terminal, and capable of determining whether a received message is addressed to a local terminal comprising said network interface, and of ordering the retransmission of said received message, with a possible modification, if said received message is not addressed to the local terminal or if said received message is addressed to the local terminal and also to at least one other network terminal, where the local terminal is used as a relay terminal.

2. An installation according to claim 1, wherein each network interface further comprises a memory capable of storing at least one list of terminals that it receives and one list of terminals able to receive it.

3. An installation according to claim 2, wherein the routing unit is capable of maintaining and transmitting said list of terminals that it receives, and maintaining the list of terminals that received it, from said at least some of the received messages.

4. An installation according to claim 3, wherein the routing unit is capable of storing in a memory a local routing table establishing a correspondence between a final destination terminal and a relay terminal at a symmetrical range from said local terminal.

5. An installation according to claim 3, wherein each network interface is capable of storing information that it receives, said information being of the type such that a second terminal is received by such other third terminal.

6. An installation according to claim 5, wherein each network interface is capable of forcing an emission of artificial messages.

7. An installation according to claim 6, wherein at least some of said artificial messages emitted by a network interface are used for services, and especially for the transmission to terminal(s) stored in its local routing table, of the list of terminals that it receives and/or at least a part of the information included in its routing table.

8. An installation according to claim 6, wherein at least some of said artificial messages are used for the exchange of information useful for understanding the messages.

9. An installation according to claim 2, wherein each routing unit is also capable of storing in the memory another table forming a topological directory and comprising multiplets, each of said multiplets comprising:
   a first element which is one of the symmetrical range terminals of the list of terminals that received it,
   an intermediary element which is a terminal that may directly or indirectly receive it,
   and a last element which is a figure indicating a number of skips that are necessary for reaching the terminal corresponding to said intermediary element, thereby allowing to determine a relay terminal at symmetrical range required for relaying a message to a chosen terminal of the network.

10. An installation according to claim 9, wherein the routing unit is capable of maintaining and modifying the multiplets of the topological directory according to said at least some of the received messages.

11. An installation according to claim 9, wherein a message to relay comprises a definition of maximum number of relay terminals.

12. An installation according to claim 2, wherein each routing unit is also capable of storing in the memory a broadcast table comprising at least a part of said terminals at symmetrical range, each terminal of said part being able to reach at least one network terminal, in view of the broadcast of a message with multiple destinations.

13. An installation according to claim 12, wherein the routing unit is capable of maintaining and modifying the broadcast table according to said at least some of the received messages.

14. An installation according to claim 1, wherein a message with multiple destinations comprises a broadcast number.

15. An installation according to claim 4, wherein each routing unit is capable of modifying at least a part of a received message, before its retransmission in view of a relay or a broadcast, according to its routing table.

16. An installation according to claim 15, wherein the message comprises:

a header including at least information designating one or more destination terminals of the message, and a body, wherein the modification of a received message to broadcast concerns the modification of at least a part of the destination terminal information included in its header, said information being comprised in the broadcast table.

17. An installation according to claim 15, wherein the message comprises:

a header including at least information designating the destination terminal of the message, and a body, wherein the modification of a message to transmit includes the addition of information relative to at least one relay terminal required for the routing of said message, said information being comprised in the routing table.

18. An installation according to claim 2, wherein the memory is rewritable and is comprised in the routing unit.

\* \* \* \* \*